United States Patent [19]

Sato et al.

[11] Patent Number: 4,527,253
[45] Date of Patent: Jul. 2, 1985

[54] DATA SEARCHING APPARATUS

[75] Inventors: Kazuhiro Sato, Ebina; Takashi Kumagai; Takuo Ishizuka, both of Hadano; Tadatsugu Ishizuka, Yokohama, all of Japan

[73] Assignee: Hitachi, Ltd., Tokyo, Japan

[21] Appl. No.: 383,271

[22] Filed: May 28, 1982

[51] Int. Cl.³ .............................. G06F 7/02; G06F 7/04
[52] U.S. Cl. ................................................... 364/900
[58] Field of Search ............... 364/200, 900, 401, 408, 364/419, 518; 382/11, 40

[56] References Cited

U.S. PATENT DOCUMENTS

| | | | |
|---|---|---|---|
| 3,107,343 | 10/1963 | Poole | 364/900 |
| 3,197,742 | 7/1965 | Rettig et al. | 364/900 |
| 3,689,915 | 9/1972 | De Clerck et al. | 340/347 DD X |
| 3,913,074 | 10/1975 | Homberg et al. | 364/200 |
| 4,010,445 | 3/1977 | Hoshino | 382/11 X |
| 4,044,336 | 8/1977 | Babb | 364/900 |
| 4,074,235 | 2/1978 | Thomas | 364/900 |
| 4,118,788 | 10/1978 | Roberts | 364/900 |
| 4,276,597 | 6/1981 | Dissly et al. | 364/200 |
| 4,332,014 | 5/1982 | Nakazawa | 364/900 |
| 4,384,343 | 5/1983 | Morganti et al. | 364/900 |

OTHER PUBLICATIONS

IEEE 'Computer', vol. 12, No. 3, Mar. 1979, Text Retrieval Computers, by L. A. Hollaar, pp. 40-50.

Primary Examiner—Raulfe B. Zache
Assistant Examiner—William G. Niessen
Attorney, Agent, or Firm—Antonelli, Terry & Wands

[57] ABSTRACT

A data searching apparatus has a storage unit for storing a record having a plurality of fields, a first register for setting a compare condition and compare data for the fields, a compare circuit for comparing the fields of the record transferred from the storage unit with the compare data in accordance with the compare condition, a logical operation circuit for logically operating on the compare results of the compare circuit to check if the fields meet the compare condition, a buffer memory for storing the content of the record, a second register for setting attributes of the fields of the record, and control circuit for writing only those fields of the record which are determined by the logical operation circuit to meet the compare condition into the buffer memory in accordance with the attributes of the fields.

22 Claims, 8 Drawing Figures

DATA SEARCHING APPARATUS

BACKGROUND OF THE INVENTION

The present invention relates to a data searching apparatus, and more particularly to a data searching apparatus for searching a record which meets a certain condition from records transferred to a data processing unit.

In a prior art method for searching a record based on the result of field-by-field comparison of records transferred from an external storage unit, such as a magnetic tape unit or a magnetic disc unit, to a data processing unit, the data read from the storage unit is stored in a buffer area of the main storage unit in the data processing unit through a channel and the records are fetched one at a time to an area of the main storage unit referred to by a program and the results are logically operated on by the program. In such a prior art method, however, the search speed is influenced by the instruction execution time of the processor which processes the program and a high speed processor is required to attain a high search speed. Such a high speed processor is usually expensive and hence has a low cost-performance.

In order to improve the search speed, a method has been proposed in which a data searching facility is imparted to a storage control unit. In this method, when field data is transferred from the storage unit to the storage control unit, the storage control unit compares the field data one field at a time with predetermined data and sets the results in latches. The latched data is logically operated on by a microprogram before the next data is transferred to check whether or not the respective records meet the search condition and a record which meets the search condition is processed.

In this method, however, in order for the microprogram processing to be executed within the time gap between the records, it is necessary to stop the transfer of the next record from the storage unit to the storage control unit or to set a gap passing time to be longer than the execution time of the microprogram. As a result, when a plurality of records are sequentially processed, the processing performance is lowered in proportion to the execution time of the microprogram. In addition, because of the presence of the gaps, the blocking of the records is not attained.

In order to allow the field-by-field comparison of the blocked records and the logical operation based on the comparison results without a time delay, a hardware execution without microprogram has been proposed. In this method, however, since undesired field data is also stored in the buffer memory in storing a compare-equal data, the utilization efficiency of the buffer memory is low and wasteful transfer time from the storage control unit to the channel is included because not only the desired fields but also other fields in the same record are stored in the buffer memory when the record meets the search condition.

SUMMARY OF THE INVENTION

It is an object of the present invention to provide a data searching apparatus which can utilize a buffer memory efficiently and reduce the data transfer time.

In order to achieve the above object, in accordance with a feature of the present invention, the results of field-by-field comparison of records from a storage unit with reference data are logically operated on and only a desired field in a compare-equal record is stored in a buffer memory.

DESCRIPTION OF THE PREFERRED EMBODIMENTS

Figure 1:
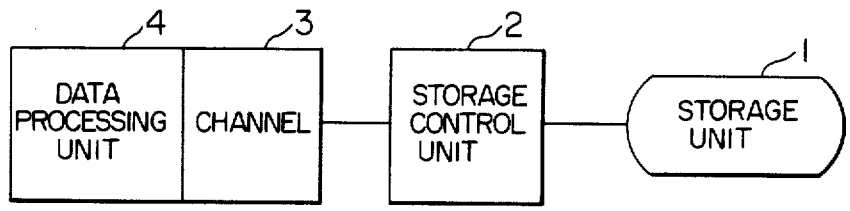
FIG. 1 shows a schematic block diagram of a system including a data searching apparatus of the present invention.

FIG. 1 shows a schematic block diagram of the data searching apparatus of the present invention.

When field data forming a record is transferred from a storage unit 1 to a storage control unit 2, the storage control unit 2 compares the field data, one field at a time, with predetermined data and logically operates on the results to check whether or not the record meets a search condition, and if it meets the search condition, the storage control unit 2 stores a desired field of the record in a buffer memory. It then reads out the content of the buffer memory and transfers it to a data processing unit 4 through a channel 3.

Figure 2:
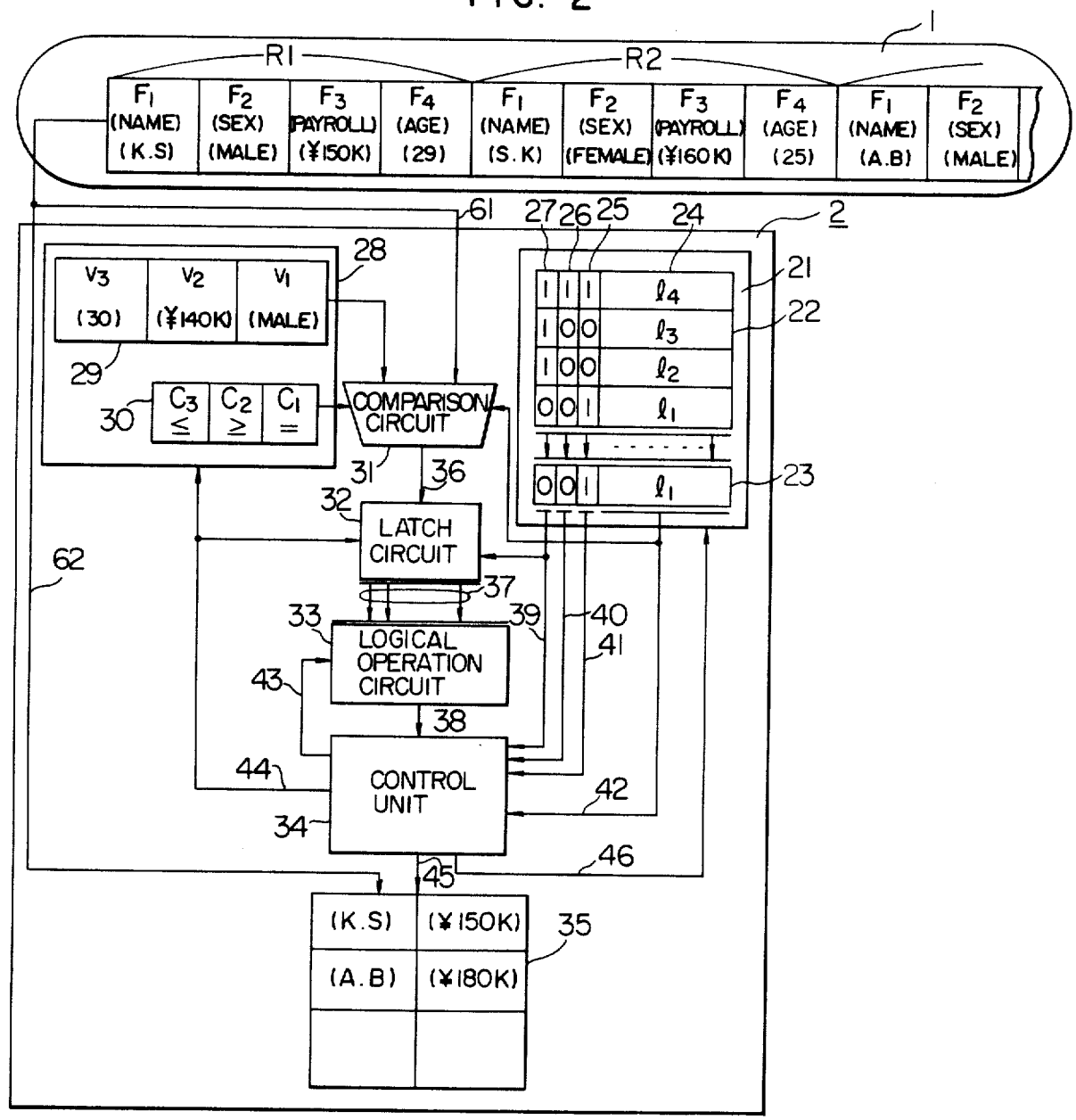
FIG. 2 shows a configuration of one embodiment of the data searching apparatus of the present invention.
Figure 3:
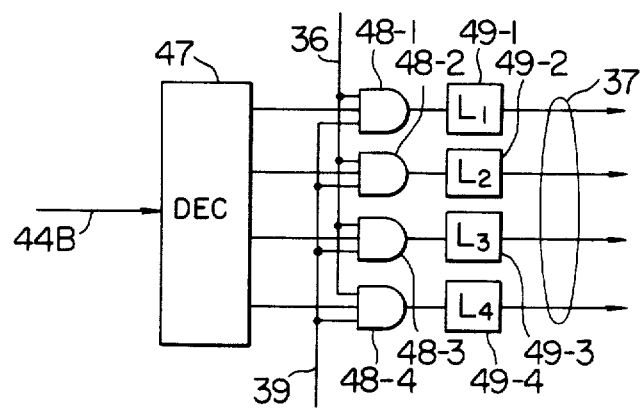
FIG. 3 shows a configuration of a latch circuit shown in FIG. 2.
Figure 4:
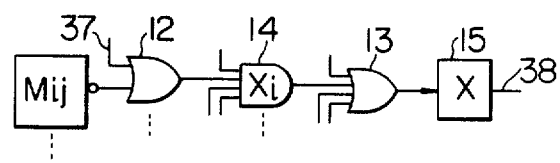
FIG. 4 shows a configuration of a logical operation circuit 33 shown in FIG. 2.

FIGS. 2, 3 and 4 show embodiments of the data searching apparatus of the present invention.

Figure 5:
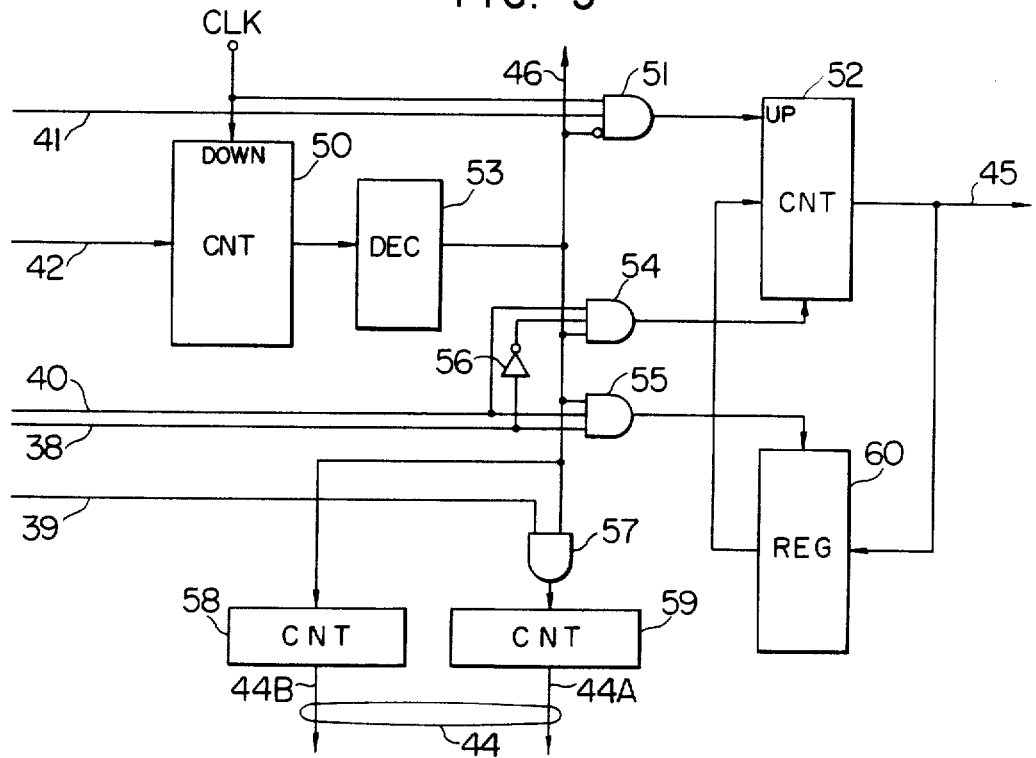
FIG. 5 shows a configuration of a control unit shown in FIG. 2.

FIG. 2 shows a block diagram of one embodiment of the storage control unit 2 shown in FIG. 1, FIG. 3 shows a circuit diagram of the latch circuit 32 shown in FIG. 2, FIG. 4 shows a circuit diagram of the logical operation circuit 33 shown in FIG. 2, and FIG. 5 shows a circuit diagram of the control unit 34 shown in FIG. 2. It is now assumed that each of the records R1, R2, . . . stored in the storage unit 1 has four fields $F_1$, $F_2$, $F_3$ and $F_4$ indicating name, sex, payroll and age, respectively, and that the fields required by the data processing unit 4 (called selection fields) are fields $F_1$ (name) and $F_4$ (age). It is further assumed that the following search condition (query) is set: "Indicate names and ages of employees whose sex is male, whose payroll is no less than ¥150,000 and whose age is no older than 30." The lengths and the attributes of the fields $F_1$–$F_4$ are set in field length buffers 22 of a field length buffer unit 21. The lengths $l_1$–$l_4$ are set in field length areas 24 of the respective field length buffers 22 for the fields $F_1$–$F_4$, "1"s are set in selection field flag areas 25 of the field length buffers 22 for the fields $F_1$ and $F_4$, "1"s are set in compare field flag areas 27 of the field length buffers 22 for the fields $F_2$, $F_3$ and $F_4$, and "1" is set in a last field flag area 26 of the field length buffer 22 for the field $F_4$. Compare data $V_1$–$V_3$ is set in compare data buffers 29 of a compare data buffer unit 28 in the order of the compare fields $F_2$, $F_3$ and $F_4$. In the present example, $V_1$="male", $V_2$="¥150,000" and $V_3$="30 years old". Compare conditions $C_1$ are set in a compare condition register 30 in the order of the compare fields $F_2$, $F_3$ and $F_4$. In the present example, $C_1$="=", $C_2$="≧" and $C_3$="≦". A compare circuit 31 compares the data for each of the fields $F_2$, $F_3$ and $F_4$ and signals on a line 36 indicating the compare results are set in a latch circuit 32. As shown in FIG. 3, the latch circuit 32 comprises latches 49-1–49-4 one for each of the fields $F_1$–$F_4$ ($L_1$–$L_4$ indicating the contents of the latches), a decoder 47 responsive to a signal on a line 44B for controlling the storing of the compare result on the line 36 to the selected one of the latches 49-1–49-4, and four AND gates 48-1–48-4. Signals on output lines 37 of the latches 49-1–49-4 of the latch circuit 32 are supplied to a logical operation circuit 33 where they are checked by a circuit to determine whether or not they meet the predetermined condition.

FIG. 4 shows the configuration of the logical operation circuit 33. It comprises a latch circuit 11 (having a content $M_{ij}$ corresponding to the content $L_j$ of the latch circuit 32) which is set and reset by a microprogram or other means, OR circuits 12 and 13, an AND circuit 14 and a latch circuit 15 for storing a result X, and it carries out the following logical operation:

$$X_{ij} = L_j \vee \overline{M}_{ij}$$

$$X_i = X_{i1} \wedge X_{i2} \wedge \ldots \wedge X_{in} (i=1, 2, \ldots, N)$$

$$X = X_1 \vee X_2 \vee \ldots \vee X_N$$

The search condition (query) described above is expressed by a logical expression of "$F_2$ = male AND $F_3 \geq$ ¥150,000 AND $F_4 \leq$ 30 years old"

The logical operation circuit 33 is conditioned from a control unit 34 through a line 43 such that it produces a signal "1" on a line 38 when the signals on the output lines 37 of the latch circuit 32 meet the above logical expression.

After the initialization set forth above, data transfer from the storage unit 1 is started. In the field length buffer unit 21, the information relating to the field $F_1$ is set into the field length register 23 from the field length buffer 22. The field length area 24, the selection field flag area 25, the last field flag area 26 and the compare field flag area 27 of the register 23 are sent to the control unit 34 through lines 42, 41, 40 and 39, respectively. The field length area 24 and the compare field flag area 27 are also supplied to the compare circuit 31 and the latch circuit 32, respectively, through the lines 42 and 39. As shown in FIG. 5, the control unit 34 sets the field length area supplied from the line 42 into a field length counter 50. When the data transfer from the storage unit 1 is started, the counter 50 is counted down in synchronism with a data transfer clock CLK generated by a clock generator (not shown). On the other hand, the data read from the storage unit 1 is supplied to the compare circuit 31 through a line 61 and also to a buffer memory 35 through a line 62.

Processing for the field $F_1$

Since the field $F_1$ is a selection field, the selection field flag 25 on the line 41 is "1". The control unit 34 sends the clock CLK to an address counter 52 through an AND gate 51 to increment the address counter 52, which initially stores a start address of an area in the buffer memory 35 in which the field $F_1$ is to be stored. The buffer memory 35 sequentially stores the data of the field $F_1$ supplied from the line 62 in an area specified by a signal on an output line 45 of the address counter 52.

On the other hand, since the field $F_1$ is not the compare field and hence the compare field flag 27 on the line 39 is "0", the control unit 34 does not activate the compare data buffer 28. Accordingly, the signal on the output line 36 of the compare circuit 31 is not significant. Since the compare field flag 27 on the line 39 is "0", the latch circuit 32 does not latch the output on the output line 36 to any latch. Accordingly, the outputs on the lines 37 of the latch circuit 32 do not change and all lines 37 have "0" outputs. As a result, the output of the logical operation circuit 33 indicates non-equal. When the readout of the data of the field $F_1$ is completed, the output of the counter 50 assumes "0". When the decoder 53 detects this condition, it produces a "1" output. Since the last field flag 26 on the line 40 supplied to the AND gates 54 and 55 is "0", the outputs of the AND gates 54 and 55 remain "0" and the contents of the address counter 52 and the register 60 do not change. Since the compare field flag 27 from the line 39 is "0", the output of the AND gate 57 is "0" and a signal on an output line 44A of the counter 59 remains at the initial count "0". When the output of the decoder 53 changes to "1", the counter 58 is incremented from the initial count "0" to count 1. The "1" output of the decoder 53 is sent to the field length buffer unit 21 through the line 46 so that the field length information relating to the next field $F_2$ is set into the register 23. The field length $l_2$ is set into the counter 50. Thus, the processing for the field $F_1$ is completed.

Processing of the field $F_2$

The field $F_2$ is not a selection field. Since the selection field flag 25 on the line 41 is "0", the output of the AND gate 51 is "0". Accordingly, the control unit 34 does not increment the address counter 52 and does not write the data of the field $F_2$ from the line 62 into the buffer memory 35.

On the other hand, since the field $F_2$ is a compare field, the control unit 34 responds to the "1" compare field flag 27 on the line 39 to activate the compare data buffer unit 28, which responds to the "0" signal supplied from the counter 59 of the control unit 34 through the line 44A to supply the first compare data $V_1$ and the compare condition $C_1$ to the compare circuit 31. When the data having a length equal to the field length $l_2$ designated by the signal on the line 42 is supplied to the compare circuit 31 from the storage unit 1, the compare circuit 31 compares the data of the field $F_2$ so far supplied with the compare data $V_1$ and the compare condition $C_1$ supplied from the buffer unit 28 and produces a result on the line 36. This output is sent to the latch circuit 32, which stores the output in the latch 49-2 which corresponds to the count 1 of the counter 58 of the control unit 34 supplied through the line 44B. Since the content of the counter 50 becomes 0 when the field $F_2$ is compared, the "1" output of the decoder 53 of the control unit 34 causes the count of the counter 59 to be incremented from 0 to 1 and the count of the counter 58 to be incremented from 1 to 2. The signal on the output line 46 of the decoder 53 causes the field length information relating to the next field $F_3$ to be set into the field length register 23. Thus, the processing for the field $F_2$ is completed.

Processing for the field $F_3$

Since the field $F_3$ is not a selection field, the data of this field is not written into the buffer memory 35. Since this field is a compare field, the data is compared with the compare data $V_2$ and the compare condition $C_2$ and the result is stored in the latch 49-3 of the latch circuit 32, in the same manner described for the field $F_2$. When the processing is completed, the field length data relating to the field $F_4$ is stored in the field length register 23.

Processing for the field $F_4$

Since this field is a selection field, the address counter 52 is incremented in synchronism with the clock CLK as was done for the field $F_1$ and the data of this field is stored in the area of the buffer memory 35 next to the area in which the data of the field $F_1$ was stored.

On the other hand, since this field is also a compare field, the compare operation is carried out as was done for the fields $F_2$ and $F_3$ and the result is stored in the latch 49-4 of the latch circuit 32. When the readout of the data of the field $F_4$ is completed, the decoder 53 of the control unit 34 assumes "1". The control unit 34 operates in a different manner depending on whether the signal on the output line 38 of the logical operation circuit 33 is "1" or "0".

When the signal on the output line 38, the output of the decoder 53, and the last field flag 26 are all "1", the output of the AND gate 55 is "1". This "1" output causes the address register 60 to read in the output of the address counter 52. The content of the address counter 52 does not change. Accordingly, the data of the next record R2 is stored at the next address to the count of the address counter 52. The address register 60 is used to store the data of the next record R3 in the buffer memory 35 when no compare-equal is detected for the record R2. As a result, the data of the fields $F_1$ and $F_4$ in the buffer memory 35 is retained.

When the signal on the output line 38 is "1", the output of the AND gate 54 is "0" because the inversion of the signal on the output line 38 of the logical operation circuit 33 by an inverter 56 is applied to the AND gate 54. In response to the output of the AND gate 54, the content of the address register 60, that is, the initial value used to store the data of the field $F_1$ to the buffer memory 35 is set into the address counter 52. Accordingly, in the course of the search for the record R1, the result of the search for the next record R2 is stored in the area of the buffer memory 35 in which the data of the fields $F_1$ and $F_4$ were stored. As a result, the data for the record R1 stored in the buffer memory 35 is erased.

Similarly, the search and store operations for the next records R2, R3, . . . are carried out and only the selection fields of the compare-equal records are stored in the buffer memory 35.

The construction described above offers the following advantages. Since the records are searched in synchronism with the record transfer rate and only the necessary fields of the records are stored in the buffer memory 35, the buffer memory 35 can be efficiently used, the number of times of overflow of the buffer memory is reduced, the amount of data transferred to the central processing unit is reduced, the load to the central processing unit is reduced and hence the processing time is reduced.

In the embodiment described above, the compare operation only for the respective fields of a record and the compare data thereof is carried out and the compare operation for the fields between records cannot be carried out, and hence it is insufficient for the purpose of a complete data search. For example, when a series of annual records include fields for budget, travel expense and outside service fee and when it is desired to search a year the recent five years in which the outside service fee is lowest, an interfield comparison is necessary.

In another embodiment of the present invention, in order to meet the above requirement, the result of comparison of the field data with the compare data and the result of comparison between the fields can be logically operated on without time delay and only the necessary fields for the search of the record are stored in the buffer memory.

The embodiment for performing the above operation is now explained with reference to FIGS. 6, 7 and 8.

Figure 6:
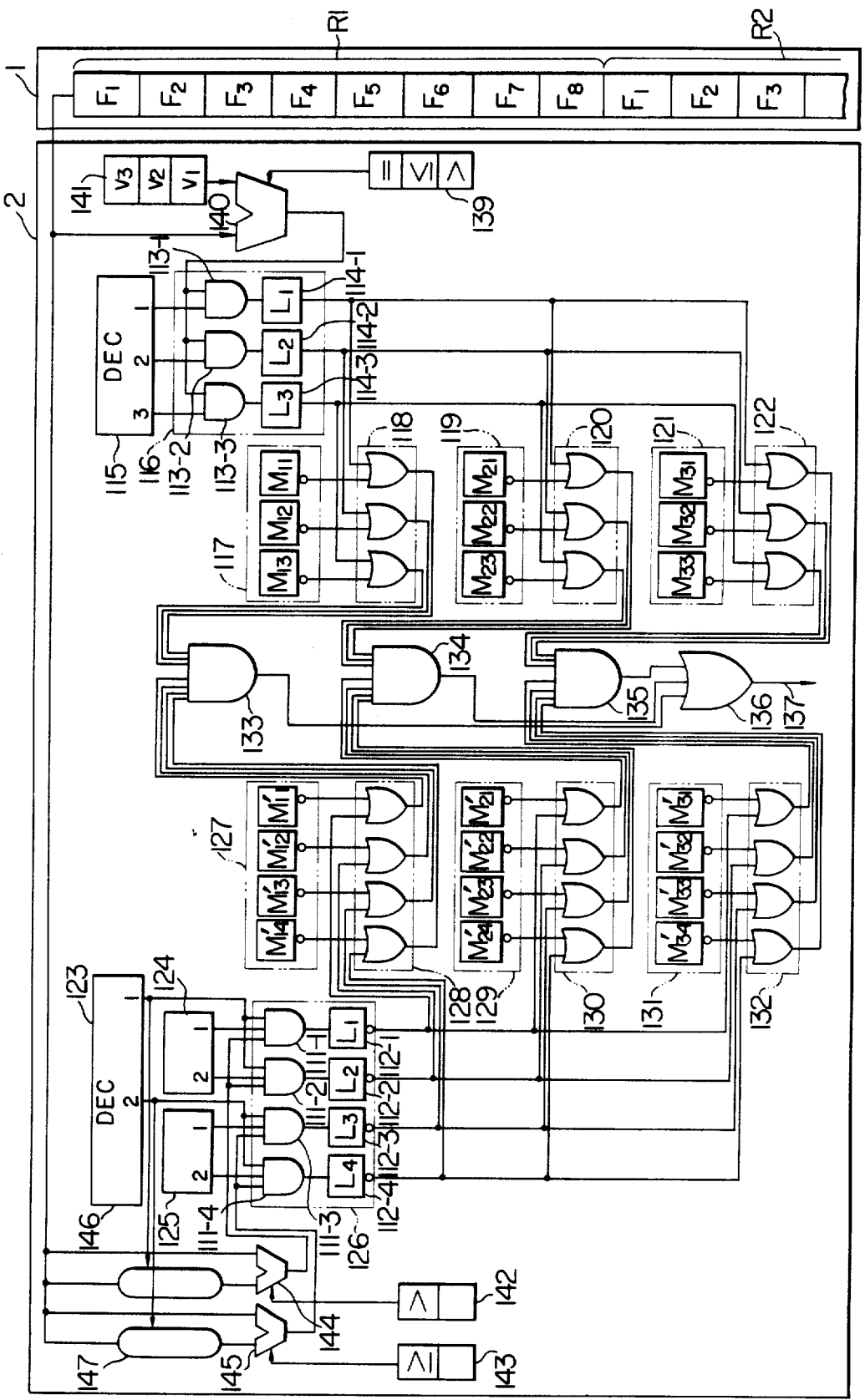
FIG. 6 shows a configuration of a major portion of another embodiment of the data searching apparatus of the present invention.

FIG. 6 shows a logical sequence chart of a search condition coincidence circuit of the data searching apparatus in accordance with the present embodiment. FIG. 7 shows a block diagram of the data searching apparatus, and FIG. 8 shows a major portion of FIG. 7.

Referring to FIG. 6, data $F_1$–$F_8$ forming records R1 and R2 is supplied from the storage unit 1 to a compare circuit 140 and compared with the content of compare data 141 by conditions stored in a compare condition register 139, and if the conditions are met, "1"s are set in latchs 114-1–114-3 (having contents $L_1$–$L_3$) of a compare result latch circuit 116, and if the conditions are not met, "0"s are set therein. They are logically operated on with preset contents of logical operation latches 117, 119 and 121 by logical operation circuits 133–136 to search the records. The setting of the latches 114-1–114-3 is carried out by opening AND gates 113-1–113-3 by a decoder 115.

The above function is identical to that of the search method in the first embodiment.

The field data $F_1$–$F_8$ from the storage unit 1 is set into registers 146 and 147 by an output of a decoder 123 and the fields are compared with each other by conditions stored in registers 142 and 143 in compare circuits 144 and 145, and if the conditions are met, "1"s are set to latches 112-1–112-4 of a compare result latch circuit 126, and if the conditions are not met, "0"s are set therein. Setting of the data into the latches 112-1–112-4 is carried out by opening AND gates 111-1–111-4 by outputs of decoders 123–125. They are logically operated on with preset contents of logical operation latches 127, 129 and 131 by logical operation circuits 133–136 to search the records.

The above function is newly added in the present embodiment.

In FIG. 6, the content of the latch 114 is represented by $L_j$, the contents of the latches 117, 119 and 121 are represented by $M_{ij}$, the content of the latch 112 is represented by $L_j'$ and the contents of the latches 127, 129 and 131 are represented by $M'_{ij}$. Thus, the circuit of FIG. 6 carries out the following operations:

$$X_{ij} = L_j \vee \overline{M}_{ij} \qquad (1)$$

$$X_{ij}' = L_j' \vee \overline{M'}_{ij} \qquad (1')$$

$$X_i = X_{i1} \wedge X_{i2} \wedge \ldots \wedge X_{in} \wedge X'_{i1} \wedge X'_{i2} \wedge \ldots \wedge X'_{im} \qquad (2)$$

In the expression (2) above, any plurality of $L_j$ and $L'_j$ selected from the compare results $L_1, L_2, L_3, \ldots L_n$, $L'_1, L'_2, \ldots L'_m$ are logically ANDed. It represents that any numbers are selected from the compare result latch circuits 116 and 126. By placing the expressions (1) and (1') into the expression (2), we get $$X_i = (L_i V \overline{M}_{i1}) \wedge (L_2 V \overline{M}_{i2}) \wedge \ldots \quad (3)$$

$$\wedge (L_n V \overline{M}_{in}) \wedge (L'_1 V \overline{M'}_{i1}) \wedge$$

$$(L'_2 V \overline{M'}_{i2}) \wedge \ldots \wedge (L'_m V \overline{M'}_{im})$$

When $X_1$ represents the output of the AND circuit 133, $X_1$ is represented by the following expression when numbers $L_1$, $L_2$, $L'_1$ are selected.

$$X_1 = (L_1 \wedge L_2 \wedge L'_1) \quad (4)$$

In order to determine $X_1$, $M_{11}$, $M_{12}$, $M'_{11}$ of the logical operation latches 117 and 127 are set to "1" and $M_{13}$, $M'_{12}$, $M'_{13}$, $M'_{14}$ are set to "0", and the contents of the compare result latches 116 and 126 and the invested outputs of the corresponding logical operation latches 117 and 127 are logically ORed by the OR circuits 118 and 128. The operation is represented by the following expression:

$$X_1 = (L_1 V \overline{1}) \wedge (L_2 V \overline{1}) \wedge (L_3 V \overline{0}) \quad (5)$$

$$\wedge (L'_1 V \overline{1}) \wedge (L'_2 V \overline{0}) \wedge (L'_3 V \overline{0}) \wedge (L'_4 V \overline{0})$$

$$= (L_1 V 0) \wedge (L_2 V 0) \wedge (L_3 V 1) \wedge (L'_1 V 0)$$

$$\wedge (L'_2 V 1) \wedge (L'_3 V 1) \wedge (L'_4 V 1)$$

$$= L_1 \wedge L_2 \wedge L'_1$$

By carrying out a logical OR operation for the terms $X_i$ of the logical AND in accordance with the following logical expression, any logical operation expression can be prepared.

$$X = X_1 V X_2 V \ldots V X_N \quad (6)$$

When the logical operation expression includes an unnecessary logical AND term, it can be deleted in the following manner. Let us assume that the logical AND term $X_3$ (output of the AND circuit 135) is to be deleted to perform the following operation.

$$X = X_1 V X_2 \quad (7)$$

In this case, the contents $M_{31}$, $M_{32}$, $M_{33}$, $M'_{31}$, $M'_{32}$, $M'_{33}$ and $M'_{34}$ of the logical operation latches 121 and 131 are set to "1". Thus, $$X_3 = L_1 \wedge L_2 \wedge L_3 \wedge L'_1 \wedge L'_2 \wedge L'_3 \wedge L'_4 \quad (8)$$

This is a sufficient condition for $X_1$ and $X_2$ to be met. Thus, under any conditions for $X_1$ and $X_2$, it is not possible that $X_1$ and $X_2$ are not met and $X_3$ is met. Whenever $X_3$ is met, $X_1$ and $X_2$ are always met.

In this manner, any logical operation term $X_i$ can be deleted.

Let us now assume that the following logical expression is to be carried out:

$$X = (L_1 \wedge L_3) V (L_1 \wedge L_2 \wedge L'_1 \wedge L'_3) \quad (9)$$

In this case, the contents $M_{11}$, $M_{12}$, $M_{13}$, $M'_{11}$, $M'_{12}$, $M'_{13}$, $M'_{14}$ of the logical operation latches 117 and 127 are set to "1", "0", "1", "0", "0", "0", "0", respectively, so that $X_i$ of the AND circuit 133 assumes $L_1 \wedge L_3$, the contents $M_{21}$, $M_{22}$, $M_{23}$, $M'_{21}$, $M'_{22}$, $M'_{23}$, $M'_{24}$ of the logical operation latches 119 and 129 are set to "1", "1", "0", "1", "0", "1", "0", respectively so that $X_2$ of the AND circuit 134 assumes $L_1 \wedge L_2 \wedge L'_1 \wedge L'_3$, and the contents $M_{31}$, $M_{32}$, $M_{33}$, $M'_{31}$, $M'_{32}$, $M'_{33}$, $M'_{34}$ of the logical operation latches 121 and 131 are set to "1", "1", "1", "1", "1", "1", "1", respectively, so that $X_3$ of the AND circuit 135 is not "1" unless all of the contents of the compare result latches 116 and 126 are "1" because all inputs to the OR circuits 122 and 132 from the logical operation latches 121 and 131 are "0". It is thus seen that the signal on the output line 137 of the OR circuit 136 is the logical OR of the AND circuits 133, 134 and 135 and hence it is equal to the expression (9) above.

$L_j$ represents the latched content of a compare condition for a field. By adding a circuit for setting second compare conditions to the same field to latch $L_{m+1}$, $L_{m+2}$, ... $L_{2m}$ and combining the contents $M_{ij}$ ($i = 1, 2, \ldots 2m$, $j = 1, 2, \ldots n$) of the logical operation latches with $L_j'$, more complex search conditions can be set.

The deletion of the unnecessary fields from the record, that is, the storing of only the necessary field into the buffer memory and the setting of the field data of the record to the registers 146 and 147 to compare the fields with each other are now explained.

Figure 7:
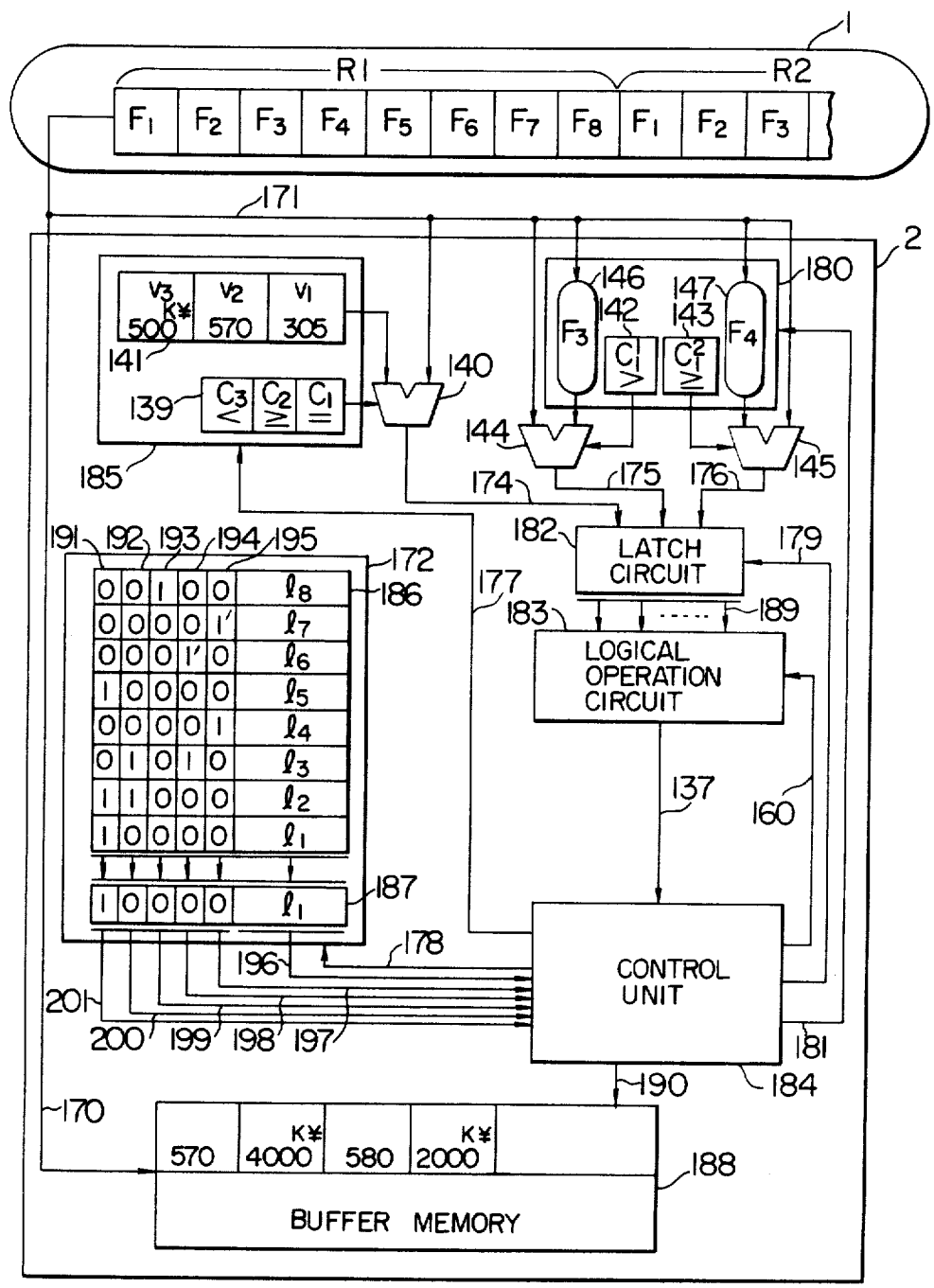
FIG. 7 shows an overall configuration of other embodiment of the data searching apparatus of the present invention.
Figure 8:
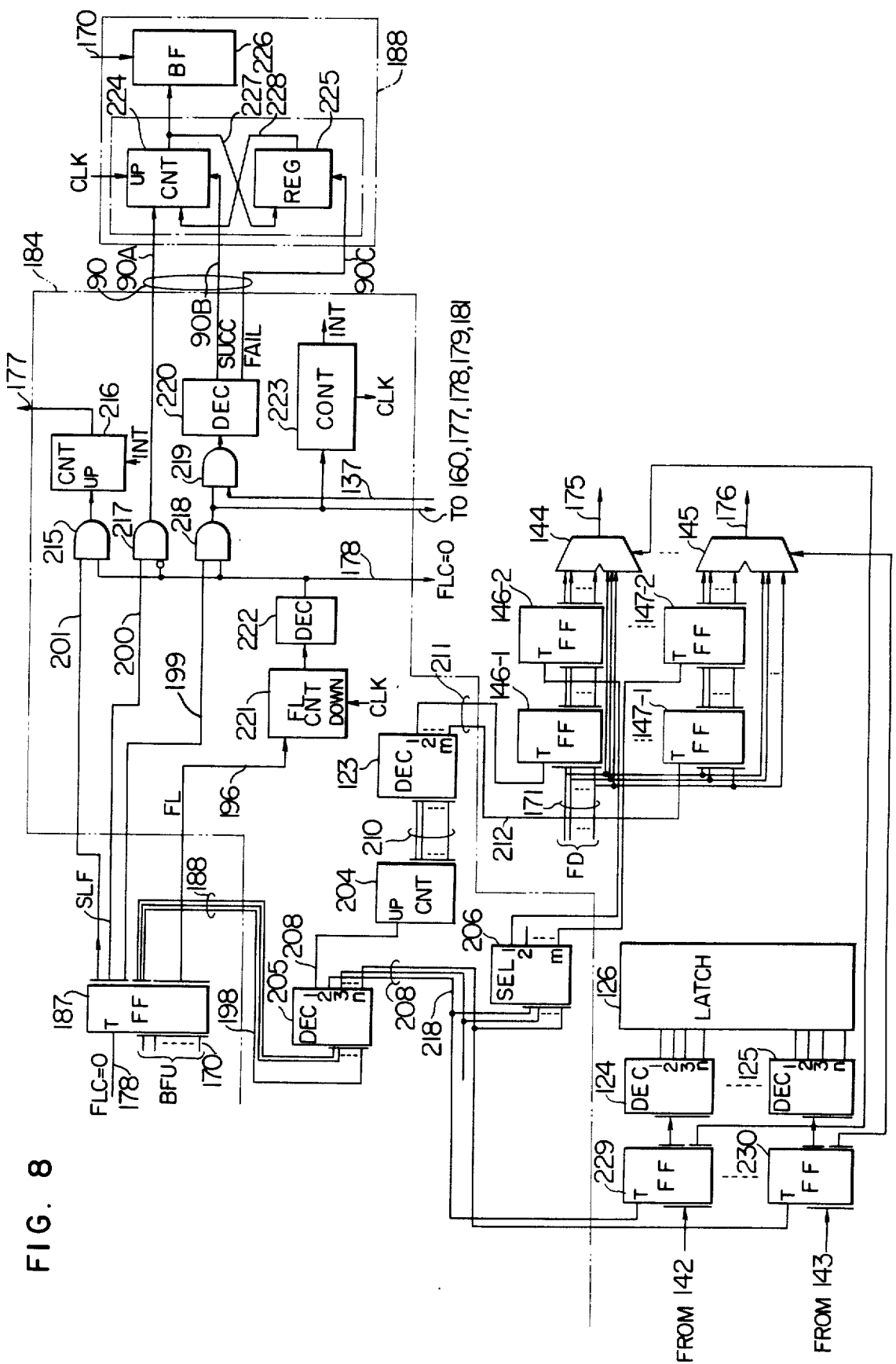
FIG. 8 shows a configuration of a control unit shown in FIG. 7.

FIG. 7 shows a block diagram of the data searching apparatus in accordance with one embodiment of the present invention, and FIG. 8 shows a block diagram of a major portion of FIG. 7.

As shown in FIG. 7, the storage control unit 2 comprises a compare data unit 185, a logical operation circuit 183, compare circuits 140, 144 and 145, interfield compare register unit 180, a latch circuit 182 (all of which are shown in FIG. 6), a control unit 184, a buffer memory 188 and a buffer unit 172. FIG. 8 shows a field information register 187 of the buffer unit 172 shown in FIG. 7, a portion of the control unit 184 and the interfield compare register unit 180.

The storing of the necessary fields into the buffer memory 188 is first explained.

An information on one field from the buffer unit 172 which retains the field information of the record is set into the field information register 187 when it is triggered by a signal FLC=0 on a signal line 178 indicating the completion of the processing of the immediately preceding field.

The field information register 187 has a function of a field length counter and responds to an information on a signal line 201 indicating that the field is necessary to store field data FD or a signal line 170 transferred from the storage unit 1 while incrementing the address of the buffer memory 188 by a count FL on a signal line 196 indicating the field length. In actuality, the field count FLC is decremented in synchronism with a clock and the field data is stored in the buffer memory 188 until the field count FLC reaches zero.

In this manner, the necessary fields are stored in the buffer memory 188 and the search condition for one record is terminated and the buffer memory address is updated based on the search result. If the record meets the search condition, the current address of the buffer memory is backed up in another register by a record coincidence signal as a trigger, and when the record does not meet the search condition, the content of the address back-up register is set into the buffer memory address counter as the buffer memory address in order to cancel the data so far stored in the buffer memory 188.

The storing of the record into the buffer memory 188 is now explained in detail with reference to FIG. 8.

If a compare field flag on a line 201 is "1", it is applied to an AND gate 215. The field length on a line 196 is decremented by the field length counter 221 and a decoder 222 checks to see if the content thereof is zero (FLC=0). If the content of the counter 221 is not zero, the output of the AND gate 215 is "0" and the content of the counter 216 remains at the initial value "0". The counter 216 is initialized by a signal INT from a control circuit 223. A signal on an output line 177 of the counter 216 controls the registers 139 and 141 of the buffer unit 185 and the decoder 115. The necessary compare data and compare conditions are supplied to the compare circuit 140 from the registers 141 and 139, respectively, to compare them with the transferred data, and the results are set in the corresponding latches of the latch circuit 116.

When the content of the counter 221 reaches zero (FLC=0) and the decoder 222 produces a "1" output, the output of the AND gate 215 assumes "1" which causes the counter 216 to be incremented to 1. The "1" output of the decoder 221 is sent to the register 187 through the line 178 so that the next field is set into the register 187.

If the selection field flag on the line 200 is "1" at that time, the output of the AND gate 217 assumes "1" which causes the buffer address counter 224 to be incremented, through the line 190A, and the data transferred from the line 170 is stored at the address of the buffer memory 226 specified by the counter 224. When FLC=0, the next field is stored in the register 187. When the last field is processed and the FLC reaches zero, the last field flag on the line 199 is set to "1" and the output of the decoder 222 assumes "1" so that the AND gate 218 is opened. The "1" output of the AND gate 218 is supplied to the AND gate 219 and the control circuit 223 and also applied to the signal lines 160, 177, 178, 179 and 181 to initialize the units in preparation for the next record processing.

The signal on the output line 137 of the logical operation circuit 183 is applied to the AND gate 219, and when the "1" signal indicating the condition met is supplied, the output signal of the AND gate 219 assumes "1" and the decoder 220 produces a signal SUCC on a line 190B. The signal SUCC is applied to the buffer address counter 224 to set the content of the buffer address counter 224 into the back-up buffer address register 225 through the line 227.

When the output of the AND gate 219 is "0", the decoder 220 produces a signal FAIL, which is applied to the back-up buffer address register 225 through the line 190C so that the content of the register 225 is set into the buffer address counter 224 through the line 228.

Thus, when the coincidence condition is met, the buffer address memory is stored at an immediately following address to the address at which the immediately succeeding coincidence data is stored.

In this manner, the necessary fields of the record are stored in the buffer memory 188 and only the field of the coincidence record is retained.

The interfield compare operation is now explained.

Based on a restrict field on a signal line 198 from the field information register (field length counter) 187, the control unit 184 identifies the fields to be compared with each other by the field decoder 205 to determine a first field signal 208 and a second field signal 218. Based on the first field signal 208, the registers (restrict registers) 146-1–146-2, 147-1–147-2 for storing the current field are determined, and the field data is stored through the AND gate 212. Based on the second field signal 218, the field selector 206 selects a second field number to be compared with the first field. When the second field is transferred from the storage unit 1, the field selector 206 produces a trigger signal T for supplying the data from the registers 146-2 and 147-2 to the corresponding comparators 144 and 145. Thus, the data in the registers 146-1, 146-2, 147-1 and 147-2 are compared with the transferred data.

A specific example is now explained.

It is assumed that each of the records comprises eight fields: $F_1$ (unit number), $F_2$ (investigation number), $F_3$ (budget for present session), $F_4$ (travel expense in present session), $F_5$ (outside service fee in present session), $F_6$ (budget for previous session), $F_7$ (travel expense in previous session) and $F_8$ (outside service fee in previous session), and the following search (query) is executed.

"Indicate investigation numbers and their budgets for the present session whose unit number is 305, whose investigation numbers are no lower than 570, whose budgets for the present session are less than those for the previous session and whose outside service fees are less than ¥ 500,000 or whose travel expenses are no less than those in the previous session."

This query can be represented by the following logical expression:

$$(F_1 = 305) \wedge (F_2 \geq 570) \wedge (F_3 > F_6) \wedge$$
$$(F_5 < ¥500K) \vee (F_1 = 305) \wedge (F_2 \geq 570)$$
$$\wedge (F_4 \geq F_7) \tag{10}$$

Prior to the start of the search, the following initializing step is executed by a microprogram or other means.

The compare condition is set into the compare condition register 139 of the control unit 2, the compare data is set in the compare data buffer 141, the compare conditions are set in the restriction compare condition registers 142 and 143 for comparing the fields, the field attritute, such as field length, compare field flag, selection field flag, last field flag and restriction register designation, is set in the field length buffer 186, and the logical operation latches of the logical operation circuit 183 are set in accordance with the logical expression (10) above. The flags 191–195 are set to the field length buffer 186, as shown in FIG. 7. The flag "1" in the first restriction register designation tag flag 194 and the second restriction register designation tag flag 195 indicates a first part in the restriction, and the flag "1'" indicates a second part. Usually, the tag flag can include only one flag "1" and a plurality of flag "1'". In the logical operation circuit 183, the logical operation latches shown in FIG. 6 are set in the following way:

$$\left. \begin{array}{l} M_{11} \sim M_{13} = 1 \\ M_{11}' = 0, M_{12}' \sim M_{14}' = 0 \\ M_{21} = M_{22} = 1, M_{23} = 0 \\ M'_{21} = M'_{22} = 0, M'_{23} = 1, M'_{24} = 0 \\ M_{31} \sim M_{33} = 0 \\ M_{31}' \sim M'_{34} = 0 \end{array} \right\} \tag{11}$$

After the above initializing step, the data transfer from the storage unit 1 is started. In the field length buffer unit 172, the information relating to the field $F_1$ is set from the field length buffer 186 to the field length counter 87.

The information relating to the field $F_1$, that is, the field length, the compare field flag 191, the selection field flag 192, the last field flag 193, the first restriction designation tag flag 194 and the second restriction designation tag flag 195 are sent to the control unit 184 through the lines 196, 201, 200, 199, 198 and 197, respectively. When the data transfer from the storage unit 1 is started, the field length counter 187 is decremented in synchronism with the transfer clock CLK.

On the other hand, the data read from the storage unit 1 is transferred to the compare circuits 140, 144 and 145 and the restriction registers 146 and 147 through the line 171 and to the buffer memory 188 through the line 170.

Processing for the field $F_1$

Based on the content of the query, the selection fields are $F_2$ (investigation number) and $F_3$ (budget for the present session), and the compare field is $F_1$. Accordingly, the control unit 184 responds to the "1" compare field flag 191 on the line 201 to activate the compare data buffer unit 185 through the line 177. The buffer unit 185 supplies the first compare data $V_1$ and compare condition $C_1$ to the compare circuit 140.

The other data of the field $F_1$ are all "0" as is seen by referring to the column of the field length $l_1$ of the buffer unit 185. Therefore, the units for those data are not activated.

Processing for the field $F_2$

After the processing for the field $F_1$, the field length data of the field $F_2$ is set to the register 187. Since the field $F_2$ is the compare field and the selection field, both the compare field flag 191 and the selection field flag 192 are "1". The subsequent processing is same as that of the prior art and hence it is not discussed here.

Processing for the field $F_3$

After the processing for the field $F_2$, the field length data of the field $F_3$ is set into the register 187. Since the field $F_3$ is the selection field and the restriction register designation field, the selection field flag 192 and the first restriction register tag flag 194 are "1". The processing for the selection field is same as that of the prior art and hence it is not explained here. The processing for the restriction designation is explained below.

A portion (relating to the restriction) of the data set in the field length counter 187 is sent to the restriction field decoder 205 of the control unit 184 through the line 198 shown in FIG. 8. Since the field $F_3$ relates to the restriction and is the first part thereof, it is supplied to the counter 204 through the line 208. The counter 204 has an initial content of zero and is incremented by the input from the line 108. The output from the counter 204 is supplied to the register address decoder 123 through the line 210 to specify the restriction first field registers 146-1, 146-2, 147-1 and 147-2 in which the field $F_3$ is to be stored. If the decoder 123 decodes the register address 1, the output of the decoder 123 on the line 211 is supplied to the restriction first field register 146-1 to trigger it. As a result, the field content FD of the field $F_3$ is stored in the restriction first field register 146-1 through the line 171. The storing into the register 146-1 is carried out while decrementing the field length data of the field $F_3$ in synchronism with the clock CLK.

After the above setting operation, when the second part of the field for restricting the field $F_3$ appears, the data from the register 146 and the data from the restriction compare condition register 142 are supplied to the compare circuit 144. On the other hand, the output of the decoder 205 is supplied to the restriction compare condition registers 229 and 230 and the outputs of the registers 142 and 143 are stored in the registers 229 and 230 at that timing, and the contents of the registers 229 and 230 are decoded by the compare number decoders 124 and 125 and the decoded results are supplied to the latch circuit 126. The compare result is set in the latch 112-1 of the compare result latch circuit 126.

Processing for the field $F_4$

After the processing for the field $F_3$, the field length data of the field $F_4$ is set in the register 187. Since the field $F_4$ is the restriction register designation field, the second restriction register tag flag 195 is "1". The subsequent processing is same as that for the field $F_3$ and hence it is not explained here. The field data of the field $F_4$ is stored in the restriction register 147. When the second part field of the field $F_4$ appears, the data in the restriction compare condition register 143 is supplied to the compare circuit 145. The compare result is set in the latch 112-3 of the compare result latch circuit 126.

Processing for the field $F_5$

After the processing for the field $F_4$, the field length data of the field $F_5$ is set in the register 187. Since the field $F_5$ is the compare field, the compare field flag 191 is "1". This processing is same as that for the field $F_1$ and hence it is not explained here.

Processing for the field $F_6$

After the processing for the field $F_5$, the field length data for the field $F_6$ is set in the register 187. Since the field $F_6$ has the "1'" restriction register tag flag 194, it is the second part of the data in the restriction register address 1. Like the fields $F_3$ and $F_4$, a portion of the data in the field length counter 187 is supplied to the restriction field decoder 205 of the control unit 184 through the line 198 shown in FIG. 8. Since the field $F_6$ relates to the restriction ($F_3 > F_6$) and the second part thereof, the output of the field decoder 205 is supplied to the field selector 206 through the line 207 to determine the first part of this field. The restriction register 146-1 is specified by the output of the selector 206, and the data in the register 146-1 and the compare condition in the restriction compare condition register 142 are supplied to the compare circuit 144 together with the field data FD from the line 171 at the timing of the output of the selector 206. The data in the restriction register 146-1 and the data in the restriction compare condition register 142 are supplied to the compare circuit 144 in synchronism with the transfer of the field $F_6$. The compare result is set in the latch of the compare result latch circuit 126.

Processing for the field $F_7$

After the processing for the field $F_6$, the field length data of the field $F_7$ is set into the register 187. Since the field $F_7$ has the "1'" restriction register tag flag 195, it is the second part of the data of the restriction register address 2. The subsequent processing is same as that for the field $F_6$ and hence it is not explained here.

Processing for the field $F_8$

After the processing for the field $F_7$, the field length data of the field $F_8$ is set into the register 187. Since the field $F_3$ has the "1" last field flag 193, the subsequent processing is same as that described above. Since the content of the buffer memory address counter of the control unit 184 does not change, the data in the next record are stored at the next address to the content of the address counter.

As described hereinabove, according to the embodiments of the present invention, the compare results of the fields of the record read from the storage unit with the compare data as well as the compare results of the fields with each other are logically operated on by the hardware. Accordingly, even if the records are blocked with small interrecord gaps, the record can be searched for a more complex search condition than that of the prior art. In addition, since only the necessary fields of the record are stored in the buffer memory, the buffer memory can be efficiently utilized and the amount of transfer to the data processing unit can be reduced and the processing time can be reduced.

We claim:

1. A data searching apparatus comprising:
a storage unit for storing a record having a plurality of fields;
first setting means for storing a compare condition and compare data for each field of a record in said storage unit;
compare means connected to receive a record transferred from said storage unit for comparing said fields of said transferred record with said compare data in accordance with said compare condition set in said first setting means and in synchronism with said transferring of said record;
logical operation means connected to receive the output of said compare means for logically operating on the compare results of said compare means in synchronism with said transferring of said record to check whether or not said fields meet said compare condition;
a buffer memory for storing selected fields of said record according to attributes of said fields;
second setting means for storing attributes of said fields of said record; and
control means connected to said buffer memory and said logical operation means for writing only those fields into said buffer memory which are determined by said logical operation means to meet said compare condition and which have a given attribute as designated by said second setting means.

2. A data searching apparatus according to claim 1, wherein said second setting means stores as said attributes the lengths of said fields and the operational requirements of said fields.

3. A data searching apparatus according to claim 1 wherein said attributes of said fields include an indication of whether or not the field is a field to be compared by said compare means, an indication of whether or not the field is a field to be written into said buffer memory and data indicating whether or not the field is the last field of the record.

4. A data searching apparatus according to any one of claims 1 to 3 wherein said compare means includes a first latch circuit for latching outputs $L_j$ which meet said compare condition, and said logical operation means includes a second latch circuit for latching present values $M_{ij}$ and a logical operation circuit for carrying out the following operations to determine if said fields meet said compare condition based on an operation result X:

$$X_{ij} = L_j + \overline{M}_{ij}$$

$$X_i = X_{i1} \cdot X_{i2} \cdot \ldots \cdot X_{in} \ (i=1, 2 \ldots N)$$

$$X = X_1 + X_2 + \ldots X_N$$

where, $X_{ij}$ represents values of the outputs $L_j$ gated by the values $M_{ij}$, and $X_i$ represents the logical produce of $X_{ij}$ over all values of j.

5. A data searching apparatus comprising:
a storage unit for storing a record having a plurality of fields;
first setting means for storing a first compare condition and compare data for said fields and a second compare condition for comparing said fields with each other;
compare means connected to receive a record transferred from said storage unit for comparing said fields of said transferred record with said compare data set by said first setting means or comparing said fields with each other in accordance with said first compare condition or said second compare condition and in synchronism with said transferring of said record;
logical operation means connected to receive the output of said compare means for logically operating on the compare results of said compare means to check if said fields meet said compare conditions;
a buffer memory for storing selected fields of said record; and
control means connected to said buffer memory and said logical operation means for writing only those fields into said buffer memory which are determined by said logical operation means to meet said compare conditions.

6. A data searching apparatus according to claim 5, wherein said compare means includes a first latch circuit for latching outputs $L_j$ and $L_j'$ which meet said first compare condition and said second compare condition, respectively; said logical operation means includes a second latch circuit for latching values $M_{ij}$ and $M'_{ij}$ which are preset for said outputs $L_j$ and $L_j'$, respectively, and a logical operation circuit for carrying out the following logical operations to determine if said fields meet said compare conditions based on an operation result X:

$$X_{ij} = L_j + \overline{M}_{ij}$$

$$X'_{ij} = L'_j + \overline{M}'_{ij}$$

$$X_i = X_{i1} \cdot X_{i2} \cdot \ldots \cdot X'_{i1} \cdot \ldots \cdot X'_{im}$$

$$X = X_1 + X_2 + \ldots X_N$$

where, $X_{ij}$ represents values of the outputs $L_j$ gated by the values $M_{ij}$, $X'_{ij}$ represents values of the outputs $L'_j$ gated by the values $M'_{ij}$, and $X_i$ represents the logical product of $X_{ij}$ and $X'_{ij}$ over all values of j.

7. A data searching apparatus according to claim 5 or 6 further comprising:
second setting means for storing attributes of said fields of said record, wherein said control means comprises means for writing into said buffer memory only those fields which are determined by said logical operation means to meet said compare conditions in accordance with said attributes of said fields stored in said second setting means.

8. A data searching apparatus in which a field or fields of a record meeting a desired search condition are selected from a storage unit containing therein a plurality of records each having a field or fields provided for predetermined data items and the selected are written into a buffer memory, said apparatus comprising:
first setting means for storing therein a pair of compare data and associated compare condition data which are preliminarily defined corresponding to each of those ones of said predetermined data items which are selected depending on said desired search condition;

second setting means for setting and storing therein field attributes which are preliminarily defined corresponding to said predetermined data items, each of said field attributes including at least first information indicative of whether or not a field for the corresponding data item is one to be written into said buffer memory;

means for transferring a field or fields of the records from said storage unit to compare means in synchronism with the transfer thereof to said buffer memory;

said compare means comprising means for comparing a field or fields from said storage unit with the compare data from said first setting means in accordance with the associated compare condition therefrom for said selected data items;

logical operation means for receiving the results of the comparison operation from said compare means to logically operate on them for each field, thereby judging whether or not that field meets said desired search condition; and control means for receiving the field attributes from said second setting means and an output of said logical operation means to control the writing of the fields, transferred from said storage unit, into said buffer memory so that only the fields for which the output of said logical operation means indicates an affirmative judgement are written into said buffer memory.

9. A data searching apparatus according to claim 8, wherein field length data concerning the lengths of the respective fields for said predetermined data items are stored together with said field attributes in said second setting means.

10. A data searching apparatus according to claim 9, wherein each of said field attributes stored in said second setting means includes second information indicative of whether or not a field for the corresponding data item is one to be subjected to comparison in said compare means, and third information indicative of whether or not a field for the corresponding data item is the last one in each record.

11. A data searching apparatus according to claim 10, wherein said control means is responsive to the first information and the field length data from said second setting means for controlling the supply of the compare data and the associated compare conditions from said first setting means to said compare means so that they are inputted into said compare means in synchronism with transfer of the fields of each record from said storage unit for said selected data items.

12. A data searching apparatus according to claim 8, wherein each of the records contained in said storage unit has the same number of plural fields, the transfer of the records to said compare means is carried out record by record, the logical operation by said logical operation means is carried out for each record, the control of the writing by said control means is made so that for one of the records the output of said logical operation means indicates an affirmative judgement, only the contents of those fields which are selected in accordance with the first information of said field attributes are written into said buffer memory.

13. A data searching apparatus according to claim 8, wherein said control means includes an address counter for designating an address of said buffer memory in which a field of the record transferred from said storage unit is to be written, said control means including means for incrementing said address counter in response to the first information from said second setting means indicating the writing of a field for the corresponding data item into said buffer memory and for resetting said address counter to a value smaller than the current content thereof by the number of fields per record to be written into said buffer memory in response to the output of said logical operation means indicating a negative judgement.

14. A data searching apparatus in which a field or fields of record meeting a desired search condition and selected from a storage unit containing therein a plurality of records each having a field or fields provided for predetermined data items and the selected field or fields are written into a buffer memory, said apparatus comprising:

first setting means for storing therein a pair of compare data and associated first compare condition data which are preliminarily defined corresponding to each of those first ones of said predetermined data items which are selected depending on said desired search condition, and second compare condition data which is preliminarily defined for comparison between fields for those second ones of said predetermined data items which are selected depending on said desired search condition;

means for transferring a field or fields of the records from said storage unit to compare means in synchronism with the transfer thereof to said buffer memory;

said compare means comprising means for comparing the contents of the field or fields from said storage unit for said selected first data items with the compare data from said first setting means in accordance with the associated first compare condition data therefrom, and for comparing the contents of the fields for said selected second data items with each other in accordance with the second compare condition data from said first setting means;

logical operation means for receiving the results of comparison from said compare means to logically operate therein for each field, thereby judging whether or not that field meets said desired search condition; and control means responsive to an output of said logical operation means for controlling the writing of the fields, transferred from said storage unit, into said buffer memory so that only the contents of the field or fields for which the output of said logical operation means indicates an affirmative judgement are written into said buffer memory.

15. A data searching apparatus according to claim 14, further comprising second setting means for setting and storing therein field attributes which are preliminarily defined corresponding to said predetermined data items, each of said field attributes including at least first information indicative of whether or not a field for the corresponding data item is one to be written into said buffer memory, and said control means also including means responsive to the field attributes from said second setting means for writing into said buffer memory only the contents of fields which are selected in accordance with the first information of said field attributes.

16. A data searching apparatus in which a record meeting a desired search condition is selected from a storage unit containing therein a plurality of records each having the same number of plural fields provided for predetermined data items and the content of at least one desired field of the selected record is written into a buffer memory, said apparatus comprising:

- first setting means for storing therein a pair of compare data and an associated compare condition which are preliminarily defined corresponding to each of those ones of said predetermined data items which are selected depending on said desired search condition;
- second setting means for storing therein field attributes which are preliminarily defined corresponding to said predetermined data items, each of said field attributes including at least first information indicative of whether or not a field for the corresponding data item is one to be written into said buffer memory;
- means for transferring field by field each of the records from said storage unit to said buffer memory and to compare means in synchronism with the transfer thereof to said buffer memory;
- said compare means comprising means for comparing field by field the contents of the fields from said storage unit for said selected data items with the compare data from said first setting means in accordance with the associated compare condition therefrom;
- logical operation means for receiving the results of the field-by-field comparison from said compare means to logically operate thereon for each record, thereby judging whether or not that record meets said desired search condition; and
- control means for receiving the field attributes from said second setting means and an output of said logical operation means to control the writing of the records, transferred from said storage unit, into said buffer memory so that for any one of the records for which the output of said logical operation means indicates an affirmative judgement, only the contents of those fields thereof which are selected in accordance with the first information of said field attributes, are written into said buffer memory.

17. A data searching apparatus according to claim 16, wherein field length data concerning the lengths of the respective fields for said predetermined data items are stored together with said field attributes in said second setting means.

18. A data searching apparatus according to claim 17, wherein each of said field attributes stored in said second setting means includes second information indicative of whether or not a field for the corresponding data item is one to be subjected to comparison in said compare means, and third information indicative of whether or not a field for the corresponding data item is the last one in each record.

19. A data searching apparatus according to claim 18, wherein said control means includes means responsive to the first information and the field length data from said second setting means for controlling the supply of the compare data and the associated compare conditions from said first setting means to said compare means so that they are inputted into said compare means in synchronism with the fields of each record transferred from said storage unit for said selected data items.

20. A data searching apparatus according to claim 16, wherein said control means includes an address counter for designating an address of said buffer memory in which a field of the record transferred from said storage unit is to be written, means for incrementing said address counter in response to the first information from said second setting means indicating the writing of a field for the corresponding data item into said buffer memory, and means for resetting said address counter to a value smaller than the current content thereof by the number of fields per record to be written into said buffer memory in response to the output of said logical operation means indicating a negative judgement.

21. A data searching apparatus in which a record meeting a desired search condition is selected from a storage unit containing therein a plurality of records each having the same number of plural fields provided for predetermined data items and the content of at least one desired field of the selected record is written into a buffer memory, said apparatus comprising:

- first setting means for storing therein a pair of compare data and associated first compare condition data which are preliminarily defined corresponding to each of those first ones of said predetermined data items which are selected depending on said desired search condition and second compare condition data which is preliminarily defined for comparison between fields for those second ones of said predetermined data items which are selected depending on said desired search condition;
- means for transferring field by field each of the records from said storage unit to said buffer memory and to compare means in synchronism with the transfer thereof to said buffer memory;
- said compare means comprising means for comparing field by field the contents of the fields from said storage unit for said selected first data items with the compare data from said first setting means in accordance with the associated first compare condition therefrom, and for comparing the contents of the fields for said selected second data items with each other in accordance with the second compare condition from said first setting means;
- logical operation means for receiving the results of comparison from said compare means to logically operate thereon for each record, thereby judging whether or not that record meets said desired search condition; and
- control means responsive to an output of said logical operation means for controlling the writing of the records, transferred from said storage unit, into said buffer memory so that for any one of the records for which the output of said logical operation means indicates an affirmative judgement, only the contents of desired fields thereof are written into said buffer memory.

22. A data searching apparatus according to claim 21, further comprising second setting means for storing therein field attributes which are preliminarily defined corresponding to said predetermined data items, each of said field attributes including at least first information indicative of whether or not a field for the corresponding data item is one to be written into said buffer memory, and said control means being also responsive to the field attributes from said second setting means for writing into said buffer memory only the contents of fields which are selected in accordance with the first information of said field attributes.

* * * * *